US012625515B2

(12) United States Patent
Lesi et al.

(10) Patent No.: US 12,625,515 B2
(45) Date of Patent: May 12, 2026

(54) CLOCK LEADER MONITORING FOR TIME-SYNCHRONIZED NETWORKS

(71) Applicant: Intel Corporation, Santa Clara, CA (US)

(72) Inventors: Vuk Lesi, Cornelius, OR (US); Shabbir Ahmed, Beaverton, OR (US); Christopher Gutierrez, Hillsboro, OR (US); Marcio Rogerio Juliato, Portland, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 18/399,086

(22) Filed: Dec. 28, 2023

(65) Prior Publication Data

US 2025/0216891 A1     Jul. 3, 2025

(51) Int. Cl.
*G06F 1/10* (2006.01)
*G06F 1/12* (2006.01)

(52) U.S. Cl.
CPC . *G06F 1/12* (2013.01); *G06F 1/10* (2013.01)

(58) Field of Classification Search
CPC .......................................................... G06F 1/12
See application file for complete search history.

(56) References Cited

U.S. PATENT DOCUMENTS

| | | | |
|---|---|---|---|
| 8,082,367 B2 * | 12/2011 | Etheridge | H04J 3/0682 709/248 |
| 10,034,255 B2 * | 7/2018 | Ranasinghe | H04L 7/00 |
| 11,658,798 B1 * | 5/2023 | Kratz | G01S 11/08 375/368 |
| 12,210,372 B1 * | 1/2025 | Guarro | G06F 1/12 |
| 2001/0002195 A1 * | 5/2001 | Fellman | H04L 12/6418 370/468 |
| 2011/0022734 A1 * | 1/2011 | Etheridge | H04J 3/0682 709/248 |
| 2013/0016735 A1 * | 1/2013 | De Campos Cartolomeu ............ H04L 12/413 370/458 |

(Continued)

OTHER PUBLICATIONS

Lisova, Elena, "Monitoring for Securing Clock Synchronization", Malardalen University Press Dissertations No. 256, (Apr. 16, 2018), 186 pgs.

*Primary Examiner* — Phil K Nguyen
(74) *Attorney, Agent, or Firm* — Banner & Witcoff, Ltd.

(57) ABSTRACT

Various systems and methods for evaluating time synchronization values provided from a clock leader are discussed. An example method performed by a clock follower device includes: obtaining a timestamp from a time synchronization protocol that provides synchronized time values from a clock leader; determining, based on the timestamp, a measured time drift value that represents a time drift of a hardware clock, with the time drift observed relative to the clock leader; determining an estimated time drift value that models a time drift of the hardware clock, modeled from one or more environmental conditions experienced by the hardware clock; comparing the measured time drift value with the estimated time drift value; and adjusting a clock of the device based on the timestamp, in response to validating that the measured time drift value is within a statistically expected range corresponding to the estimated time drift value.

18 Claims, 11 Drawing Sheets

(56) References Cited

U.S. PATENT DOCUMENTS

| 2022/0303034 A1 | 9/2022 | Lesi et al. | |
| 2024/0163000 A1* | 5/2024 | Agarwal | ........... H04W 56/0015 |

* cited by examiner

VIRTUAL CLOCK TRACKING AND TIME DRIFT ANALYSIS

SYNTONIZED (FREQUENCY LOCKED) HARDWARE CLOCK TRACKING

SYNTONIZED (FREQUENCY LOCKED) HARDWARE CLOCK ANALYSIS

+5000 ns/sync ORIGIN TIME ATTACK
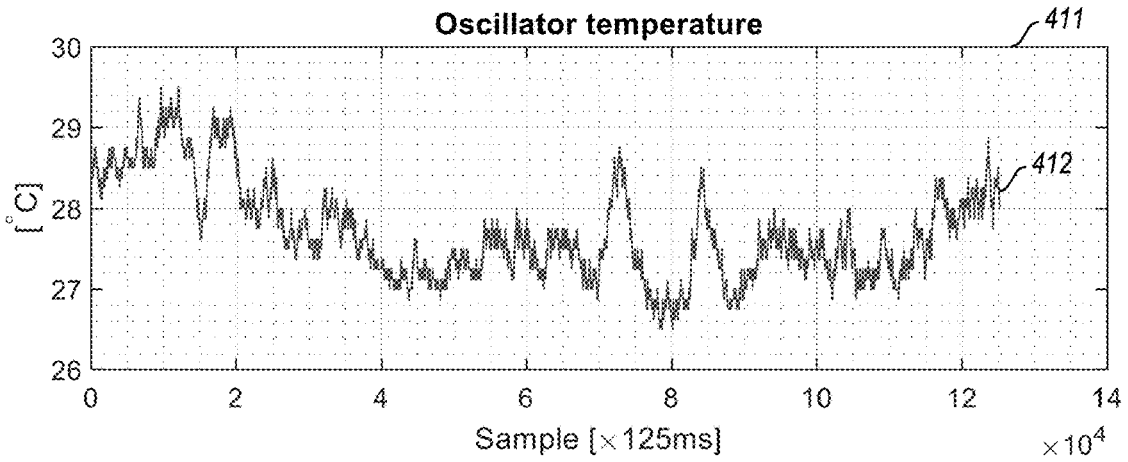
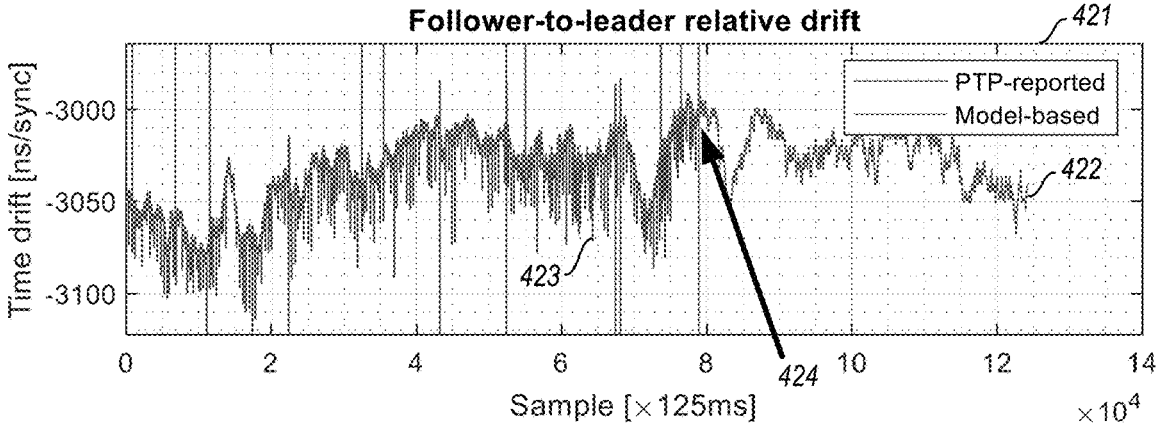
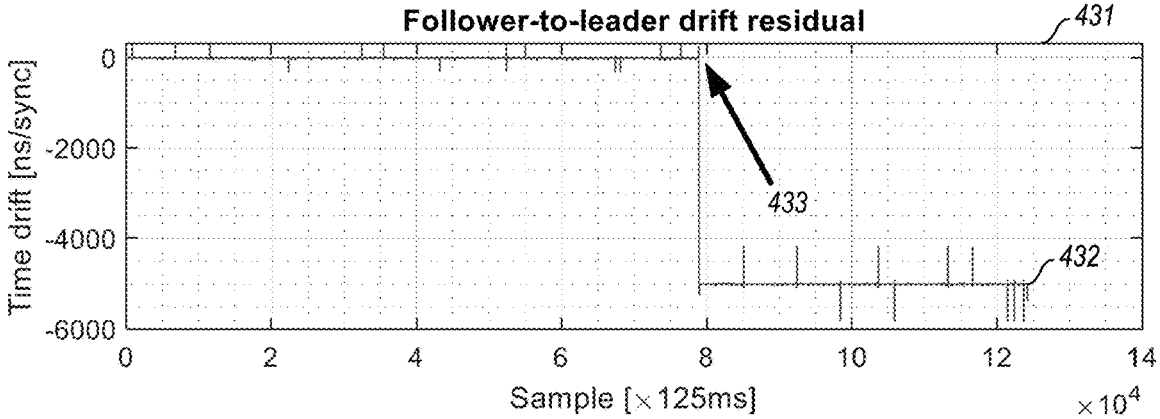
*FIG. 4A*

*+8 ns/sync ORIGIN TIME ATTACK*
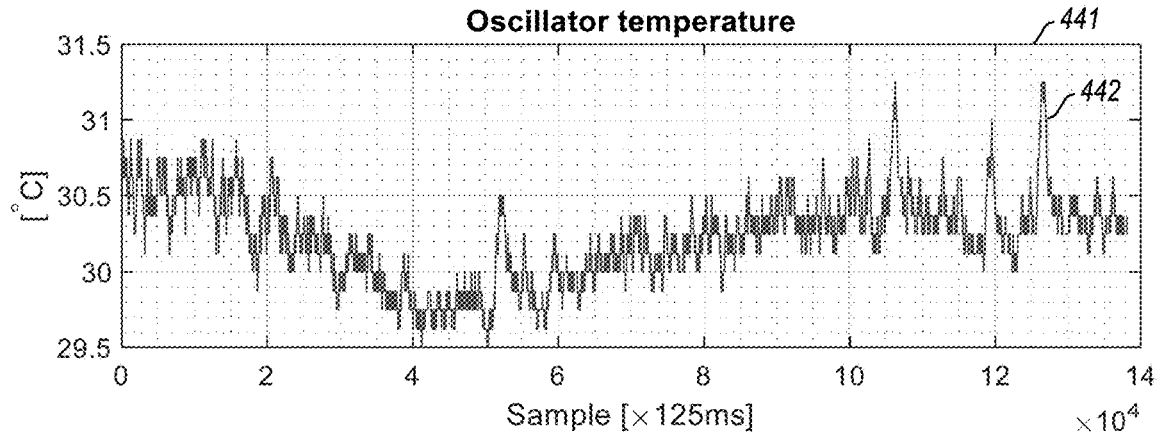
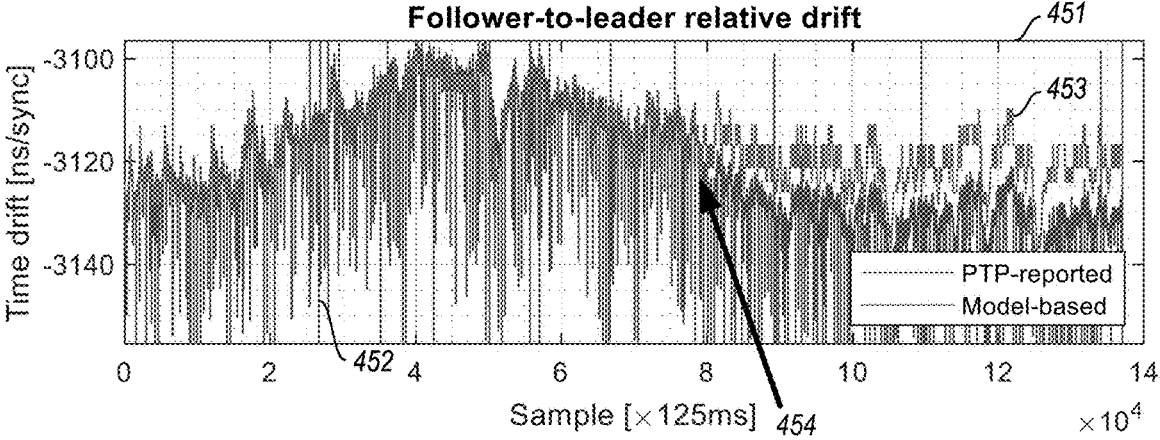
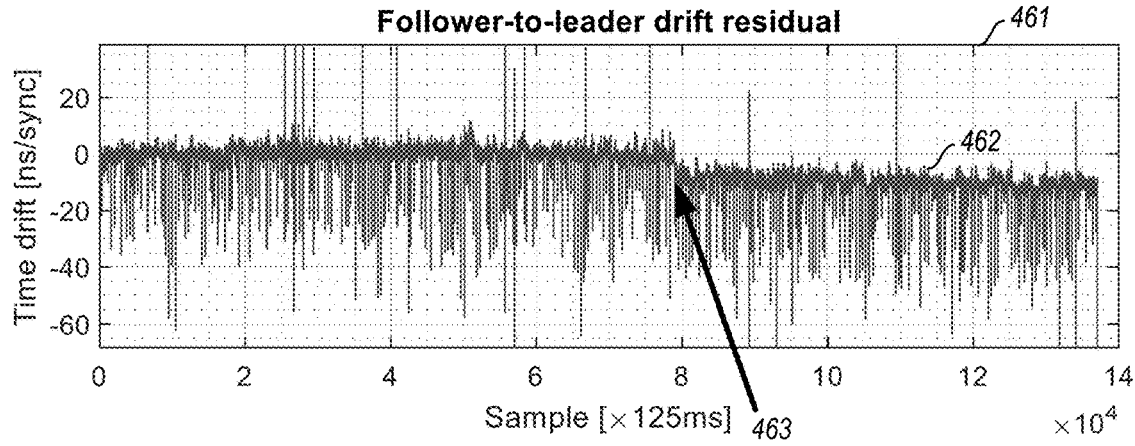
*FIG. 4B*

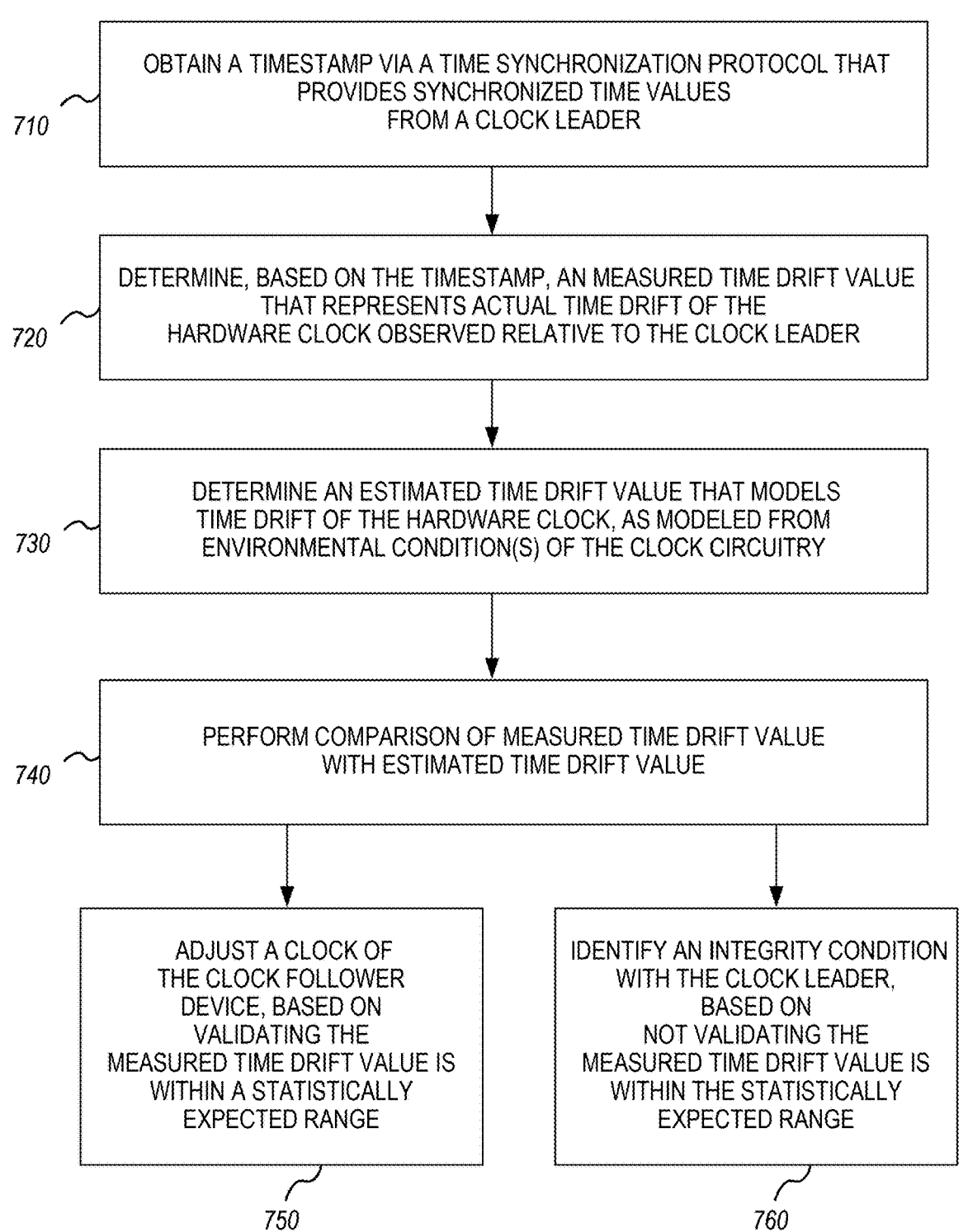

*700*

710  OBTAIN A TIMESTAMP VIA A TIME SYNCHRONIZATION PROTOCOL THAT PROVIDES SYNCHRONIZED TIME VALUES FROM A CLOCK LEADER

720  DETERMINE, BASED ON THE TIMESTAMP, AN MEASURED TIME DRIFT VALUE THAT REPRESENTS ACTUAL TIME DRIFT OF THE HARDWARE CLOCK OBSERVED RELATIVE TO THE CLOCK LEADER

730  DETERMINE AN ESTIMATED TIME DRIFT VALUE THAT MODELS TIME DRIFT OF THE HARDWARE CLOCK, AS MODELED FROM ENVIRONMENTAL CONDITION(S) OF THE CLOCK CIRCUITRY

740  PERFORM COMPARISON OF MEASURED TIME DRIFT VALUE WITH ESTIMATED TIME DRIFT VALUE

750  ADJUST A CLOCK OF THE CLOCK FOLLOWER DEVICE, BASED ON VALIDATING THE MEASURED TIME DRIFT VALUE IS WITHIN A STATISTICALLY EXPECTED RANGE

760  IDENTIFY AN INTEGRITY CONDITION WITH THE CLOCK LEADER, BASED ON NOT VALIDATING THE MEASURED TIME DRIFT VALUE IS WITHIN THE STATISTICALLY EXPECTED RANGE

*FIG. 7*

CLOCK LEADER MONITORING FOR TIME-SYNCHRONIZED NETWORKS

BACKGROUND

Time synchronization in networks involves mechanisms and standards that distribute time values and frequencies over networks. Time synchronization is used to assist computing operations so that time-sensitive tasks can be coordinated and performed correctly. Such operations may be hosted in a variety of settings such as industrial controls, telecommunications (including 5G and 6G/next-generation networking), and data center operations (including but not limited to distributed database implementations, metaverse operations, virtualization, etc.). The tools that are relied on to achieve the necessary time performance, synchronization, and bounded latency communication for networked systems are often referred to as time-sensitive networking (TSN).

In TSN implementations, clock followers (e.g., devices that use a time value, also known as a "peripheral") rely on clock leaders (e.g., devices that periodically, e.g., every synchronization cycle, provide a time value) to be legitimate time sources. In some settings, clock leaders are also referred to as a "master" clock. A malicious clock leader can annul any and all security measures used in the time synchronized fabric or used on the clock followers, in a wide variety of scenarios such as GPS sensing, software/hardware operations, etc. Some network intrusion detection systems include functionality to detect network-based man-in-the-middle attacks when invalid time packets are introduced into a network. However, these intrusion detection systems may not be able to detect all types of malicious data if the malicious data appears to be generated from a legitimate source. As a result, clock followers may not be able to detect malicious clock leaders that falsely sign origin timestamp packets and tamper with the expected clock frequency of clock followers.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 4A and 4B illustrate respective graphs of data measurements and analysis in connection with an origin time attack, according to an example.

FIG. 7 illustrates a flowchart of a method for clock synchronization, according to an example.

DETAILED DESCRIPTION

Figure 1:
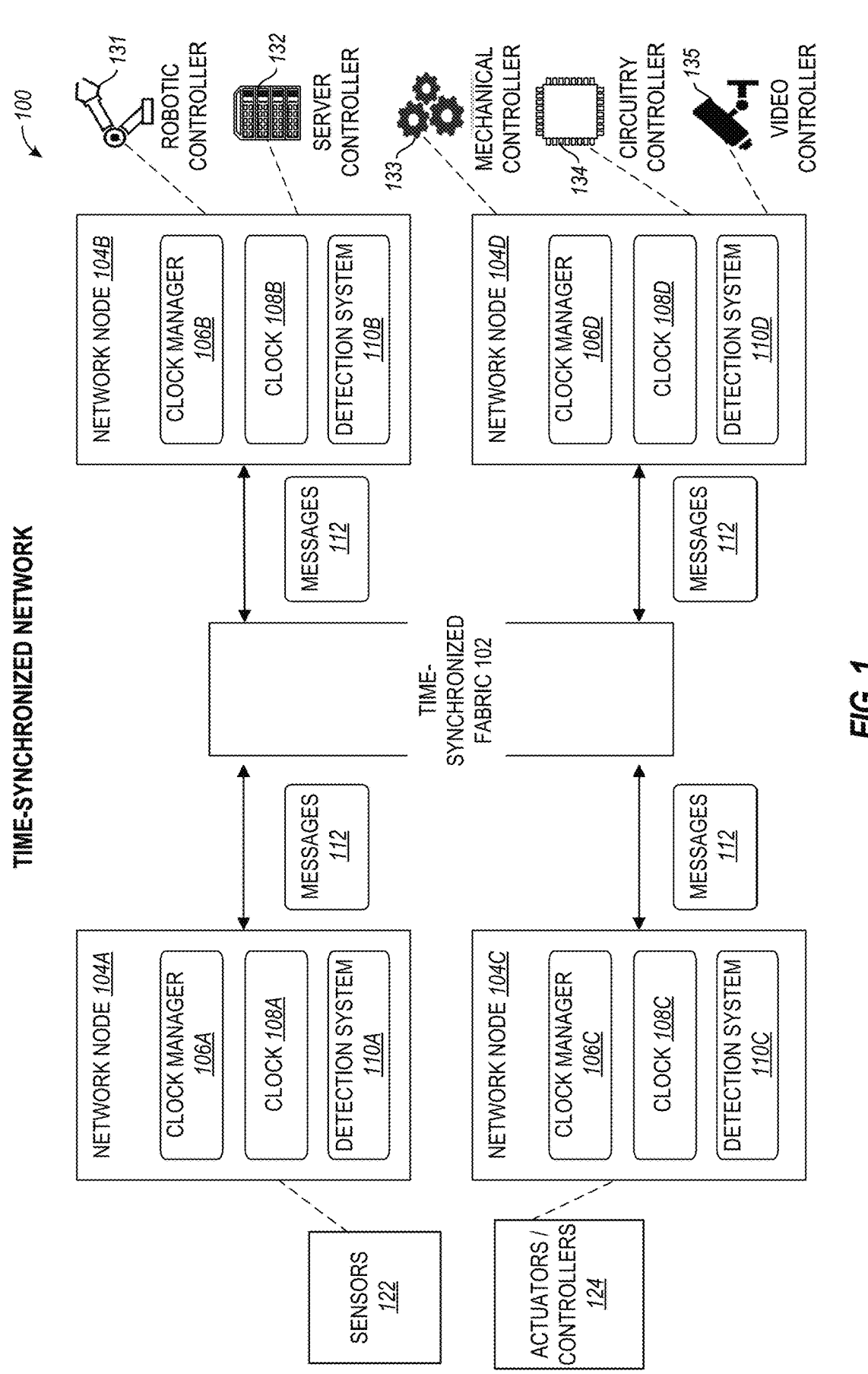
FIG. 1 illustrates an example arrangement of a time-synchronized network, according to an example.

In the following description, for purposes of explanation, numerous specific details are set forth in order to provide a thorough understanding of some example embodiments. It will be evident, however, to one skilled in the art that the present disclosure may be practiced without these specific details.

The following disclosure relates to improvements in security and functionality in time synchronization and implementation of time-sensitive applications among computing devices. Among other benefits, the following techniques can be used to identify an origin time attack from a compromised or fraudulent clock leader and to enact an appropriate response at the clock follower. Even if a time synchronization message from the clock leader is untampered, this does not guarantee that the clock leader itself is providing valid time values. Thus, the following techniques address an assumption that all clock sources in time-synchronized networks can be trusted. The lack of current approaches to identify a fraudulent clock source can cause a computing device to follow a malicious clock leader or perform a holdover to a malicious clock leader at runtime.

In an example, a data processing model is used at a clock follower to evaluate the validity of time synchronization changes provided by a clock leader. This data processing model enables a clock follower to diagnose the clock leader for potential tampering-without disruption to a normal time synchronization process at the clock follower. An example data processing model implements a mathematical model that evaluates data from one or more environmental conditions at the clock follower-including, but not limited to, a temperature of an oscillator on a network interface controller. The data processing model uses measurements of these one or more environmental conditions to predict an expected time drift between that clock follower and the particular clock source.

This expected time drift may be represented by a measurement that is comparable to a measurement of the actual time drift from the clock leader, such as a number of nanoseconds change per synchronization cycle, e.g., $$\frac{ns}{sync\ cycle}.$$

Here, a synchronization cycle refers to the periodic use of a time synchronization protocol to provide and synchronize a time value in a network from a clock leader to clock followers.

An estimation or prediction of drift can be compared and used by a clock follower at runtime to assess whether the clock source is behaving as expected. If the comparison of the estimated time drift to the measured time drift is within a statistically expected range, then the clock leader can be validated as a legitimate time source and the clock follower's virtual or hardware clock is updated. If the comparison of the estimated time drift to the measured time drift is outside of the statistically expected range, then an integrity condition can be identified with the clock leader and remedial actions can be taken (e.g., to disregard the clock update and to find a new clock leader).

As noted above, one of the problems with time-synchronized networks is that the integrity of the time synchronization value itself is typically not assessed if received from a clock leader who appears to be legitimate. Current clock leader holdover mechanisms assume that a newly acquired clock leader is trustworthy. For example, one clock leader holdover mechanism (BMCA—Best Master Clock Algorithm) relies on the authenticity of information advertised by nodes. During a holdover event, a newly acquired clock leader is assumed to be sending legitimate clock synchronization information. Some approaches have improved time synchronization operations by applying cryptographic protection to network messages sent by the clock leader. This, however, does not prevent or detect malicious attacks on the clock leader platform itself, which may result in tampered and falsified data being sent from the clock leader.

Attackers who have compromised a time-synchronized clock leader can potentially tamper with their global time reference, such as by GPS signal spoofing, or with the operation of its clock manager software, such as by tampering with offset sensing, clock adjustment computation, or frequency adjustment actuation, among other methods. Consequently, the clock leader will consume and propagate incorrect time to followers, and the incorrect timekeeping may further influence or disrupt applications at a clock follower. Accordingly, early detection of an incorrect timing value, provided by a network node operating as a clock leader, is critical in a time-synchronized network. The following approaches provide an improvement for this security risk while providing a technical improvement of related security practices due to the intrinsic dependency of the next generation of systems on time synchronization.

The following techniques are described from the perspective of specific platforms such as network interface controllers, processors, or connected circuitry platforms that are involved in time synchronization operations. However, the techniques may be implemented by other computing platforms and hardware implementations involving time synchronization. Further, aspects of the present techniques may be implemented in application programming interfaces (APIs) or programmed software at a clock follower that performs functions for secure clock leader holdover or clock leader monitoring and cross-checking. Other implementations and hardware elements will also be evident.

FIG. 1 illustrates an example arrangement of a time-synchronized network 100. A time-synchronized network 100 may be implemented by a set of standards (and amendments) that define network operations to enable time synchronization and deterministic data delivery. The time-synchronized network 100 may operate as a time-sensitive network (TSN) or similar converged networks where time-sensitive traffic co-exists with other types of traffic.

Various standards have been developed to address time-sensitive communications and related time synchronization operations. Three of the more prominent standards for enabling time-sensitive communications are promulgated by the Institute of Electrical and Electronics Engineers (IEEE). For example, IEEE 1588, IEEE 802.1AS, and IEEE 802.1Qbv provide systems and methods for synchronizing device clocks. In particular, IEEE 1588 provides a protocol for time synchronization across a network; IEEE 802.1AS provides a protocol for time synchronization across a TSN, where time-sensitive devices (e.g., clock followers) synchronize to a leader clock (e.g., clock leader); and IEEE 802.1Qbv provides for prioritizing time-sensitive traffic in the network switches using gate-controlled lists (GCLs).

In detail, FIG. 1 depicts a time-synchronized network 100 which may implement a TSN or timing synchronization standard (e.g., IEEE 1588, IEEE 802.1AS, IEEE 802.1Qbv, IEEE 802.15.4, or the like). As depicted, time-synchronized network 100 includes various network nodes 104, including network nodes 104a-d. The network nodes 104 may be implemented as different types of nodes of a TSN, such as an origination node, relay nodes, switch nodes, or an end node. The network nodes 104a-d are communicatively coupled via a time-synchronized fabric 102. The time-synchronized fabric 102 can connect the network nodes 104a-d using various types of network topology (e.g., mesh, star, etc.) and various types of communications channels (e.g., wired, wireless, fiber optic, buses, etc.). It is noted that the number of nodes in the time-synchronized network 100 is selected for purposes of clarity and not limitation. In practice, the time-synchronized network 100 can include any number and combination of nodes (e.g., origination nodes, switches, relay nodes, end devices, etc.).

The network nodes 104 communicate with each other via the time-synchronized fabric 102. For instance, the network nodes 104 can send messages 112 to each other over one or more communication channels provided by the time-synchronized fabric 102. The messages 112 can include control information and payload information. One type of control information may include time information. The time information may comprise synchronization messages, time update messages, or time follow-up messages (among other time protocol messages) for a time protocol used by the time-synchronized network 100.

Each network node 104 in the time-synchronized fabric 102 includes various hardware and/or software components. As depicted in FIG. 1, a network node 104 respectively includes a clock manager 106, a clock 108, and a detection system 110. For instance, the network node 104a includes a clock manager 106a, a clock 108a, and a detection system 110a. The network node 104b includes a clock manager 106b, a clock 108b, and a detection system 110b. The network nodes 104c, 104d are similarly configured. It may be appreciated that these are only some of the components for a network node 104, as the network node 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

Each of the network nodes 104 in the time-synchronized network 100 may include or be operably coupled to one or more sensors, actuators, controllers, or other electromechanical subsystems, including subsystems involved in real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons.

As an example use case, the network nodes 104 of the time-synchronized network 100 may be designed to capture data and/or control entities such as sensors, actuators, and controllers. In FIG. 1, the network node 104a manages various types of sensors 122, such as a signal sensor, a biometric sensor, a power sensor, an acoustic sensor, a sound sensor, a visual sensor, a speed sensor, a temperature sensor, and so forth. The network node 104c may manage actuators or controllers 124. The network node 104b may manage robotic controller 131 and server controller 132, for example. The network node 104d may manage a mechanical controller 133, a circuitry controller 134, and a video camera controller 135, for example. Other combinations or types of controllers, sensors, and actuators may be provided.

Time synchronization in the time-synchronized network 100 requires tight software-hardware interplay. A network node 104 in the time-synchronized network 100 may implement a clock manager 106 as a software component and a clock 108 as a hardware component (also referred to herein as "clock circuitry"). The clock manager 106 may adjust timing for the clock 108 to ensure synchronization with a common network time among the time-synchronized fabric 102. As an example, a precision time protocol (PTP) hardware clock (PHC) may be periodically adjusted by a PTP for Linux (PTP4L) software module to account for time offset between a clock leader and a clock follower in PTP-synchronized nodes. The detection system 110 can be implemented as a software component, a hardware component, or a combination of both software and hardware components. Embodiments are not limited in this context.

The clock manager 106 generally manages a time (e.g., clock signals) generated by the clock 108. An important component in clock synchronization mechanisms is the clock manager software. In a time-sensitive network such as the time-synchronized network 100, this component tightly interacts with network hardware (e.g., Ethernet/Wi-Fi) to obtain PTP message timestamps, as well as with PTP clock hardware to implement suitable phase/frequency corrections in order to synchronize with a clock leader. In an example, the clock manager 106 implements a "clock servo". A clock servo is a control algorithm that periodically takes as input some measurement (or estimate) of clock offset to a reference clock, and computes either time (e.g., phase) or frequency adjustment as output, to compensate for the given offset.

In an example, the clock 108 is a hardware clock provided by circuitry to generate signals for digital electronics implemented by the network node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the time-synchronized network 100, the clock 108 can be implemented as a PHC, although other types of hardware clocks can be implemented as well. Embodiments are not limited in this context.

In normal operation, a network interface (not shown) for a network node 104 can receive messages 112 that include time information representative of a network time for the time-synchronized network 100. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108. As discussed herein, these clock operations may be coordinated in connection with the results of a detection system 110 that determines whether the time information for synchronization represents a valid or invalid (e.g., fraudulent, malicious) value from a time leader.

The network node 104 may implement a physics-based model in the detection system 110 to determine an estimated or predicted time drift of a clock follower. A physics-based approach as discussed herein utilizes state prediction based on physical models of system dynamics from sensor measurements. The physics-based model may evaluate physical observations (e.g., temperature, vibration, pressure, etc.), and derivatives or second-order dynamics thereof, to produce a time-based estimated or predicted data set relevant to clock drift.

The detection system 110 is configured to monitor the clock manager 106 to detect abnormal or malicious behavior of a clock leader. This is determined by detecting whether the amount of clock drift actually experienced at a node 104 (e.g., the amount of drift measured at the clock follower relative to the clock leader, based on the time synchronization protocol) is or is not commensurate with an estimated/ predicted amount of clock drift due to the environmental conditions at the clock follower. More particularly, the detection system 110 monitors the inputs and outputs of the clock manager 106 to track an amount of "measured drift" or "actual drift" from the clock leader, and to estimate or predict the "estimated drift" or "predicted drift" in the clock follower. The detection system 110 can efficiently and securely execute the physics models at runtime in parallel to the time management functions, to provide an ongoing basis for anomaly detection and thus determine whether the measured drift being indicated by the clock leader is unexpected or invalid.

In one example, the detection system 110 operates a mathematical model that takes information from a clock follower's environment, such as temperature of a network interface controller (NIC) oscillator, and in return predicts the relative expected time drift between that follower and the particular clock leader. In an example, units of the model output are $$\frac{ns}{sync\ cycle}$$

although other measurement units may be tracked.

In the case of unsyntonized (e.g., free-running clock) clock follower configurations involving a virtual clock, the local clock drift can be directly identified. This scenario is depicted in specific detail with reference to FIG. 2. At runtime, the clock follower can track local clock drift (subject to the environment) relative to the clock leader, and flag unexpected behavior.

In the case of syntonized clock follower configurations (e.g., a hardware clock that is being actively adjusted), additional clock tracking operations are performed. These operations include the clock follower actively suspending local clock adjustment, in a safe and temporary manner, to diagnose the relative drift to the clock leader, and then flagging unexpected behavior. Thus, the clock manager allows a controlled decoupling of the local clock from the leader's clock for purposes of diagnosis. This scenario is depicted in specific detail with reference to FIGS. 3A and 3B.

Figure 2:
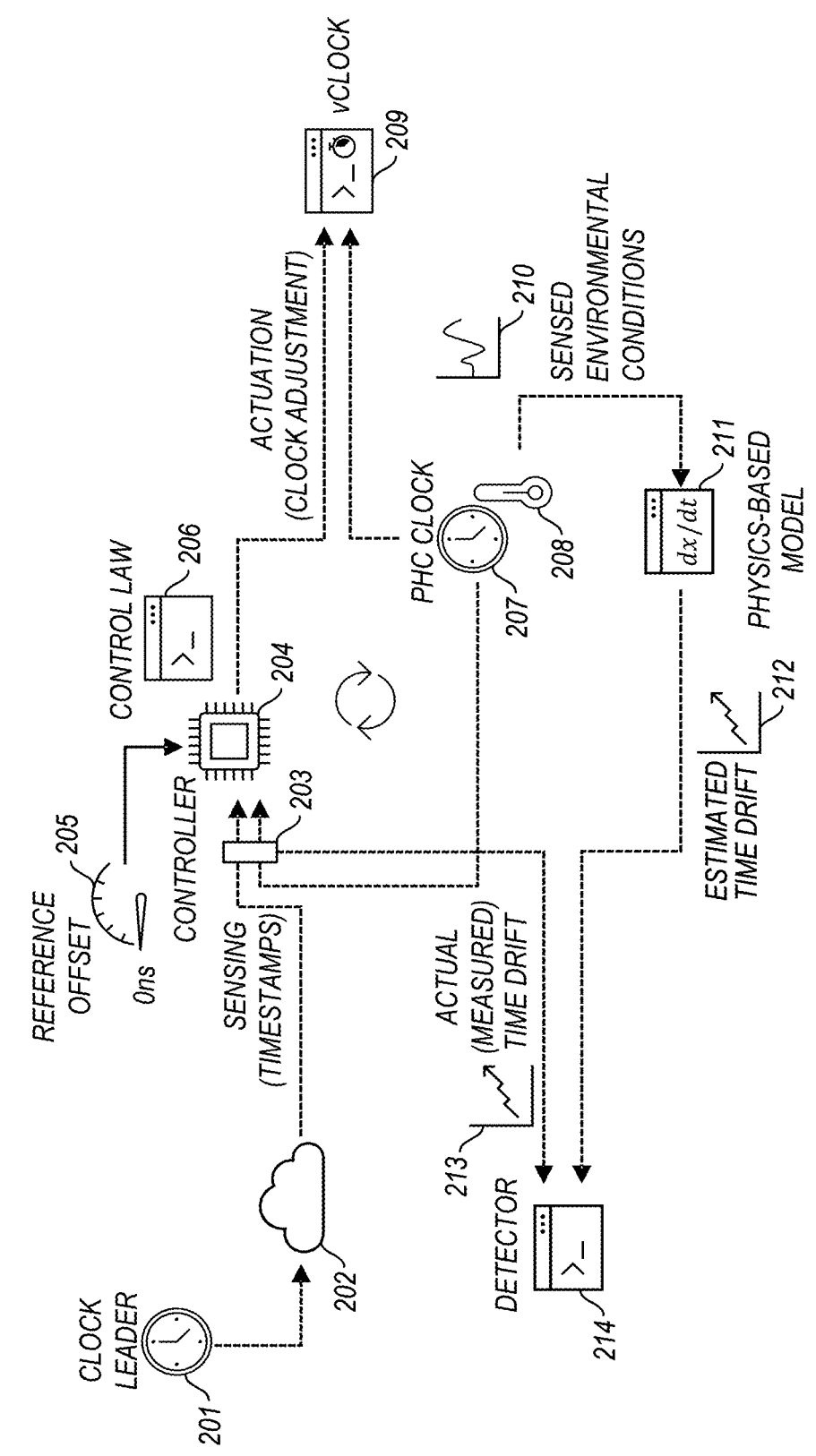
FIG. 2 illustrates a scenario for virtual clock tracking and time drift analysis, according to an example.

FIG. 2 illustrates a scenario for virtual clock tracking and time drift analysis. This scenario depicts a clock leader 201 providing time synchronization messages via a network 202 to a clock follower. The clock follower in turn receives the time synchronization messages to determine the network time values and timestamps, to be used by a controller 204 for time synchronization.

In a normal scenario, the clock follower synchronizes a virtual clock 209 of its computing system to the clock leader 201, based on changes calculated by the controller 204. The controller 204 may adjust the virtual clock based on a reference offset 205 from a physical hardware clock 207 (e.g., a PHC clock) after applying some control law 206 (e.g., to apply a clock adjustment from a result of reference offset and of previous clock adjustments). The virtual clock 209 may be implemented by a PTP4L clock management module referencing a hardware clock 207 in the case of a network node implementing a Linux operating system, with the clock servo provided from a proportional integral (PI) controller. However, the present framework is not limited to PI-based clock servos.

Additionally, at the controller 204, time synchronization timestamps 203 are sensed and collected to determine an amount of a measured time drift occurring at the clock follower (e.g., drift in the PHC clock) relative to the clock leader. This time drift analysis and the following tracking operations may be implemented by the detection system 110 discussed above. In an example, the detection system 110 performs a capture of timestamps over a time period to produce measured time drift values 213. As discussed above, these measured time drift values 213 may represent an amount of drift (in nanoseconds) relative to some amount of time (a synchronization cycle).

The measured time drift values 213 are compared to estimated time drift values 212 produced from a physics-based model 211 that analyzes the clock follower's environment. Specifically, measurements of the clock follower's environmental conditions (e.g., temperature 208 of an oscillator or a measurement of hardware components involved with timekeeping) are captured and tracked over time to provide sensed environmental measurements 210. The physics-based model 211 analyzes the sensed environmental measurements 210 and produces the estimated time drift values 212. The estimated time drift values 212 also represent an amount of drift (in nanoseconds) relative to some amount of time (a synchronization cycle).

A detector 214 is used to compare the measured time drift values 213 to the estimated time drift values 212. The detector 214 may evaluate whether the measured time drift from the clock leader is statistically similar or dissimilar from the expected time drift. Further examples of detection and modeling are discussed below with reference to FIGS. 5 and 6 and shown with the graphs of FIGS. 4A and 4B.

Figure 3A:
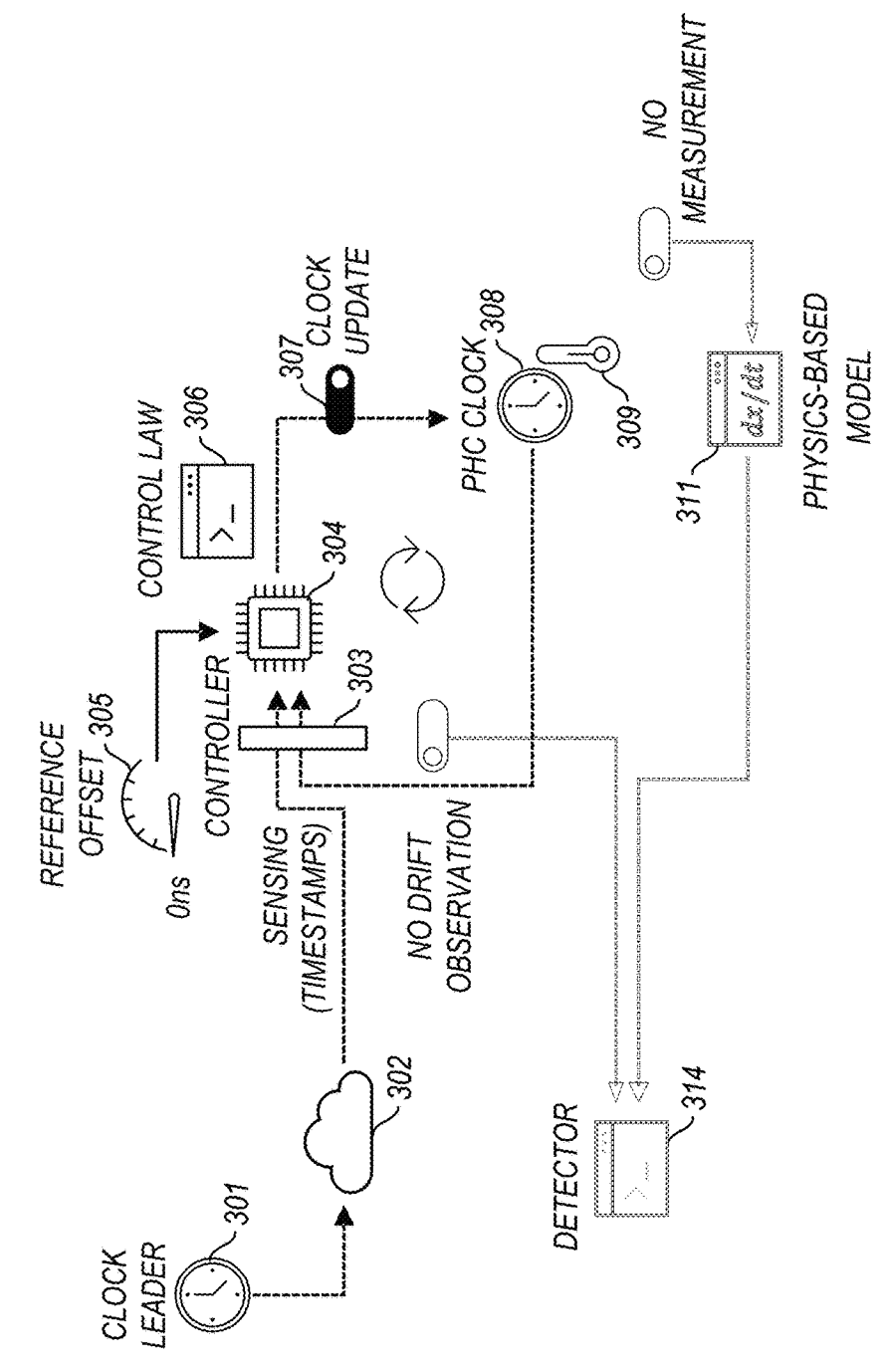
FIGS. 3A and 3B illustrate scenarios for hardware clock tracking and time drift analysis, according to an example.
Figure 3B:
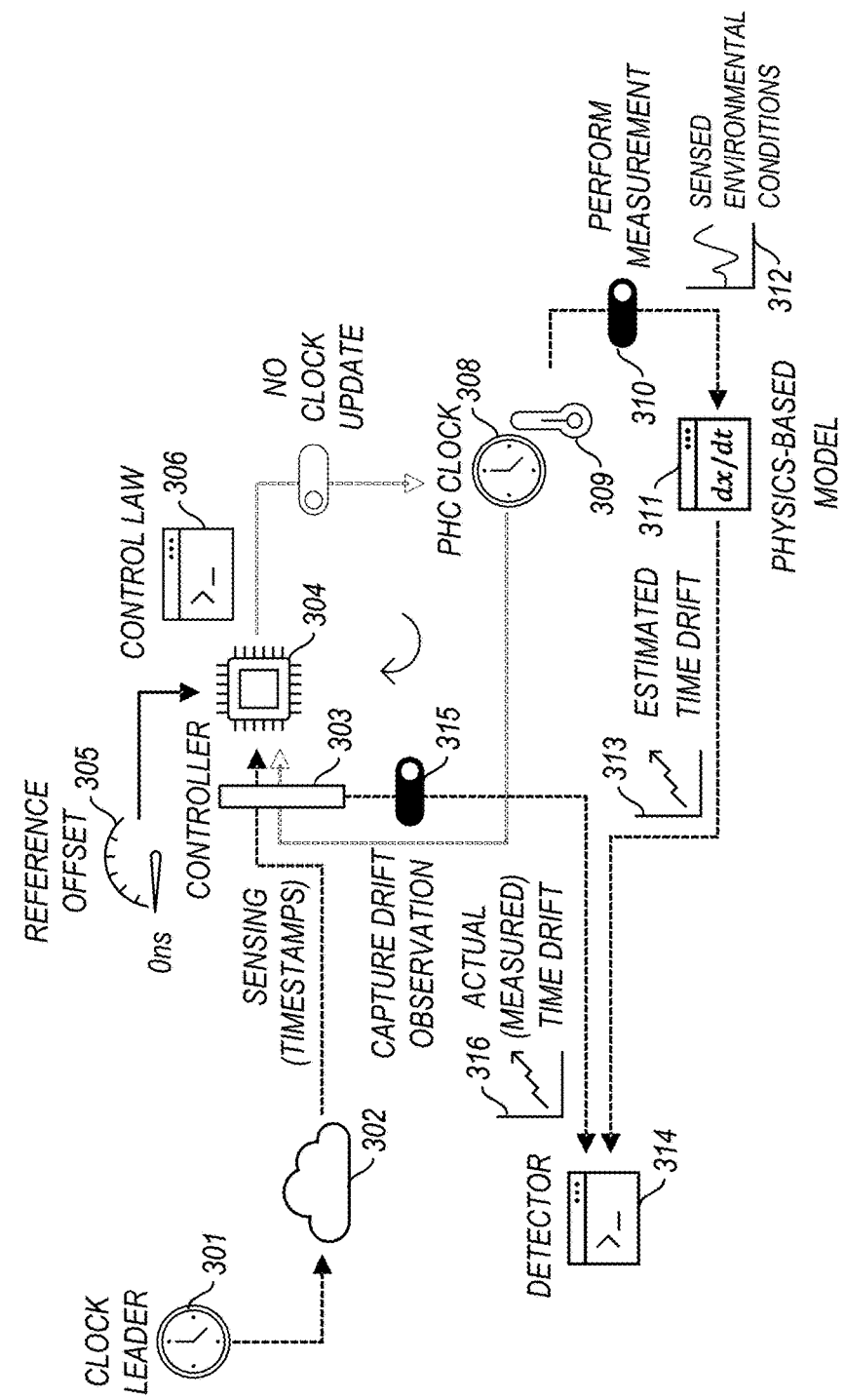

The procedures used in FIG. 2 may be modified based on a scenario where a hardware clock (e.g., PHC 308) is directly adjusted by a clock manager. FIG. 3A illustrates an example of hardware clock tracking, and FIG. 3B illustrates an example of time drift analysis with a hardware clock. The operations of FIGS. 3A and 3B may be repeated in a cycle unless (or until) an anomalous condition is detected.

FIG. 3A first shows a similar scenario as FIG. 2, where a clock leader 301 provides time synchronization messages via a network 302 to a clock follower. Here, at a first time, the controller 304 performs a clock update 307 to directly adjust a physical clock 308, based on the control law 306 and a reference offset 305. However, at this first time, the clock is updated but there is no drift observation. This is because the PHC clock in this time synchronization configuration is not independent from the clock leader.

FIG. 3B shows a similar scenario as FIG. 3A, where at a second time, the clock leader 301 provides additional time synchronization messages via the network 302 to the clock follower. At this second time, such as during cycles when time offset is controlled close to the reference value, or when the applications using synchronized time do not require maximum accuracy, the controller 304 does not perform a clock update. Instead, the controller 304 captures a drift observation 315 and performs an environmental condition measurement 310. Then, similar to the scenario in FIG. 2, the time synchronization timestamps 303 are sensed and collected to determine an amount of an actual time drift occurring at the clock follower. The detection system 110 performs a capture of timestamps over a time period to produce measured time drift values 316. The measured time drift values 316 are compared to an estimated time drift values 313 produced from a physics-based model 311 that analyzes the measurements of the environmental conditions. As above, the temperature 309 of an oscillator (or a measurement of other physical variables affecting the state of hardware components involved with timekeeping) are captured and tracked over time to provide sensed environmental measurements 312. The physics-based model 311 analyzes the sensed environmental measurements 312 to produce the estimated time drift values 313.

A comparison of estimated time drift values and the measured time drift values can be visualized with the graphs in FIGS. 4A and 4B. FIG. 4A illustrates a first scenario of an origin time attack including a graph 411 of oscillator temperature data values, a graph 421 of follower-to-leader relative drift data values, and a graph 431 of follower-to-leader drift data values. In this first scenario, each of the graphs 411, 421, 431 shows data values to be analyzed that indicate an attack where a clock leader performs a dramatic change of 5000 ns/sync at a particular time (at event 424). Here, the clock leader is implementing an aggressive change, which causes a large skew in frequency deviation between the model and the time synchronization values.

The graph 411 of oscillator temperature data values depicts how temperature data values 412 (e.g., as measured in a network interface controller oscillator) vary over a time period. The temperature data values 412 (and optionally, other environmental data values) are provided to a model of the detection system 110 (e.g., the physics-based model 211, 311) to produce estimated time drift data values 422 over the time period. As shown in graph 421, the estimated time drift data values 422 represent a relative time drift between the time leader and the time follower measured in nanoseconds per synchronization cycle.

The estimated time drift data values 422 compared on the graph 421 with PTP-reported time drift data values 423 (e.g., actual measurements of drift between the time leader and the time follower). This graph 421 shows the event 424 where the 5000 ns/sync change was provided from the clock leader. Consequently, after this event, the PTP-reported time drift data values 423 disappear from the graph 421, whereas the estimated time drift data values 422 remain charted to their expected values in the graph 421.

Finally, the graph 431 depicts data values of follower-to-leader comparison drift data values, showing the relative differences between the estimated time drift values and the measured time drift values. The data values 432 are plotted on the graph 431 to show that there is relatively insignificant differences between the estimated time drift and the measured time drift values until event 433. After event 433, a time drift of approximately 5000 nanoseconds is identified.

This modeling of an estimated time drift from environmental conditions works successfully because the clock leader provides a more stable clock that is not sensitive to environmental changes like the clock follower. This is an expected property of a clock leader in a time-synchronized network. Thus, it can be expected that only a clock follower's local environment will influence the drift when a time synchronization protocol is used.

FIG. 4B illustrates a second scenario of an origin time attack including an evaluation of a graph 441 of oscillator temperature data values, a graph 451 of follower-to-leader relative drift data values, and a graph 461 of follower-to-leader drift data values. In this second scenario, each of these data samples are measured to detect an attack where a clock leader performs a minor change of 8 ns/sync at a particular time. Here, the clock leader is implementing a slower attack, which causes a gradual skew in frequency deviation between the model and the time synchronization values.

Similar to the examples discussed above, the graph 441 of oscillator temperature data samples depicts how temperature data values 442 vary over a time period; the graph 451 depicts a relative time drift between the time leader (PTP-reported data values 452) and the time follower (model-based data values 453) as measured in nanoseconds per synchronization; and the graph 461 depicts data values of follower-to-leader comparison drift data values 462. In the graph 451, a separation of the data values 452, 453 occurs after event 454. Likewise, the graph 461 shows a minor decrease in the time drift from around 0 to around-8 ns/sync after event 463.

Some time synchronization approaches, such as those defined by the OCP TAP (Open Compute Project-Time Appliance Project), specify the use of time measurements that include an accuracy resolution of 8 ns. Thus, FIG. 4B demonstrates detectability of a compromised time leader to this level of accuracy even when only one environmental condition (the oscillator temperature) is sensed and analyzed. Accordingly, even smaller amounts of drift may be measured and detected with the use of additional measures in the present approaches.

In an example, a physical model may be used to represent the dynamics between the clock follower and clock leader clocks-expected to be short-term linear. Such a physical model can also capture the dynamics between the clock follower's (local) environment influences and the clock follower's (local) clock-expected to be nonlinear. A clock leader's stability is expected to be orders of magnitude better than the clock follower due to improved circuitry and hardware.

Figure 5:
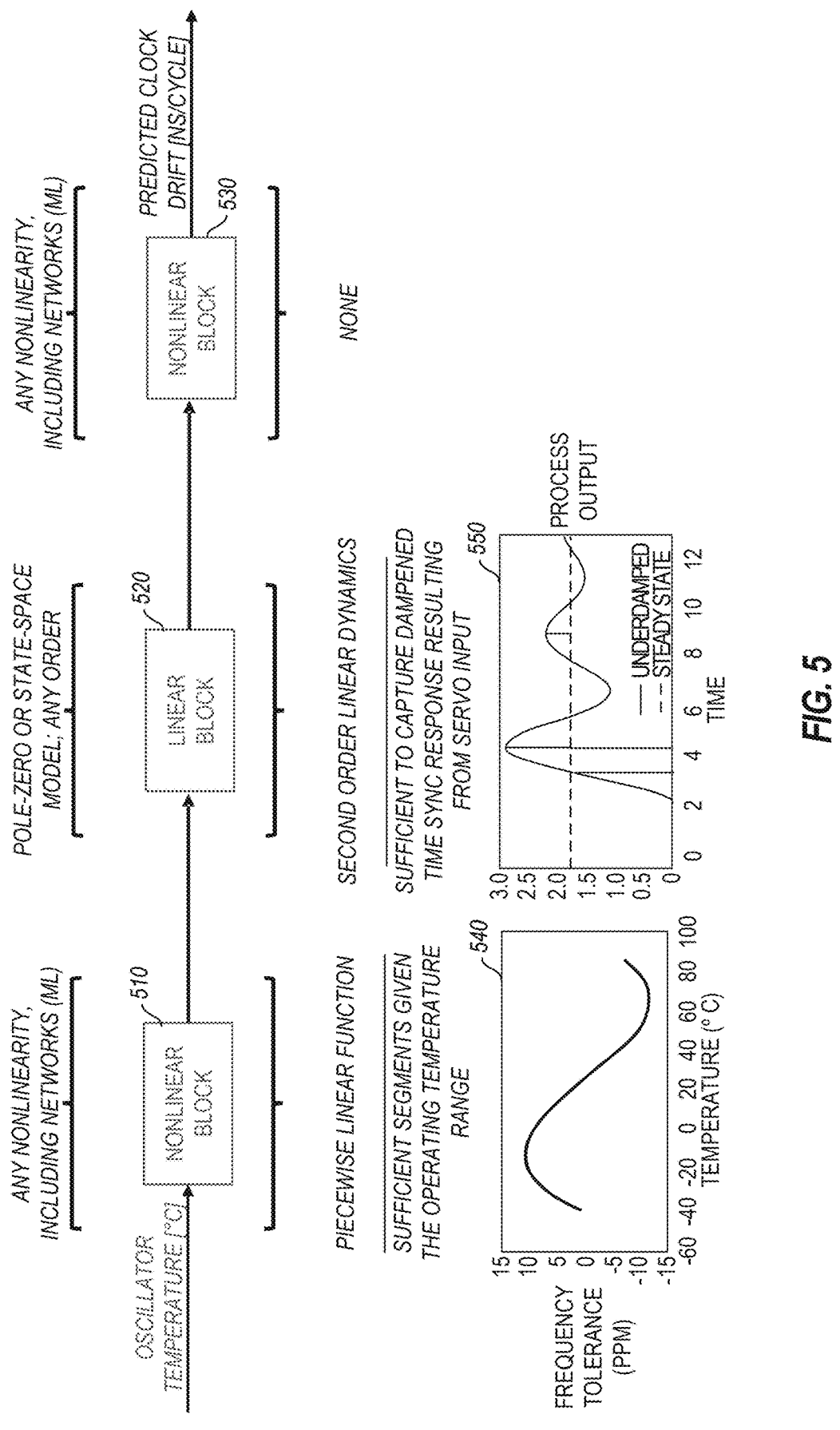
FIG. 5 illustrates a data flow in an environmental condition time drift model, according to an example.

FIG. 5 illustrates a data flow in an example environmental condition time drift model which includes data analysis blocks 510, 520, 530. For any given free-running clock follower, a physics-aware model can capture the input-output relationship from external influences on the platform clock that can be sensed (e.g., temperature, pressure, humidity, vibration), to produce an expected time offset drift from a clock leader. Thus, in a time-synchronized network, the relative time offset drift between the clock follower and the clock leader can be computed from a dynamical function of the clock follower's (local) clock frequency, the clock follower's (local) environment influences, and the clock leader's (source) clock frequency delta.

Accordingly, in FIG. 5, an environmental condition measurement (e.g., an oscillator temperature) is input to a nonlinear analysis 510. This nonlinear analysis 510 may include a piecewise linear function that defines some outcome given a particular data value range (e.g., an operational temperature range). The data graph 540 demonstrates example data values in frequency tolerance (y-axis) based on temperature measurements (x-axis).

Next, the output of the nonlinear analysis is input to a linear analysis 520. This linear analysis 520 may include the use of second order linear dynamics to capture a dampened response (e.g., resulting from servo input). The data graph 550 demonstrates example data values of a process output (y-axis) based on time (x-axis).

In some optional examples, the output of the linear analysis 520 is then input to a further nonlinear analysis 530. The final output of the model is a predicted clock drift, provided in nanoseconds per synchronization cycle.

Figure 6:
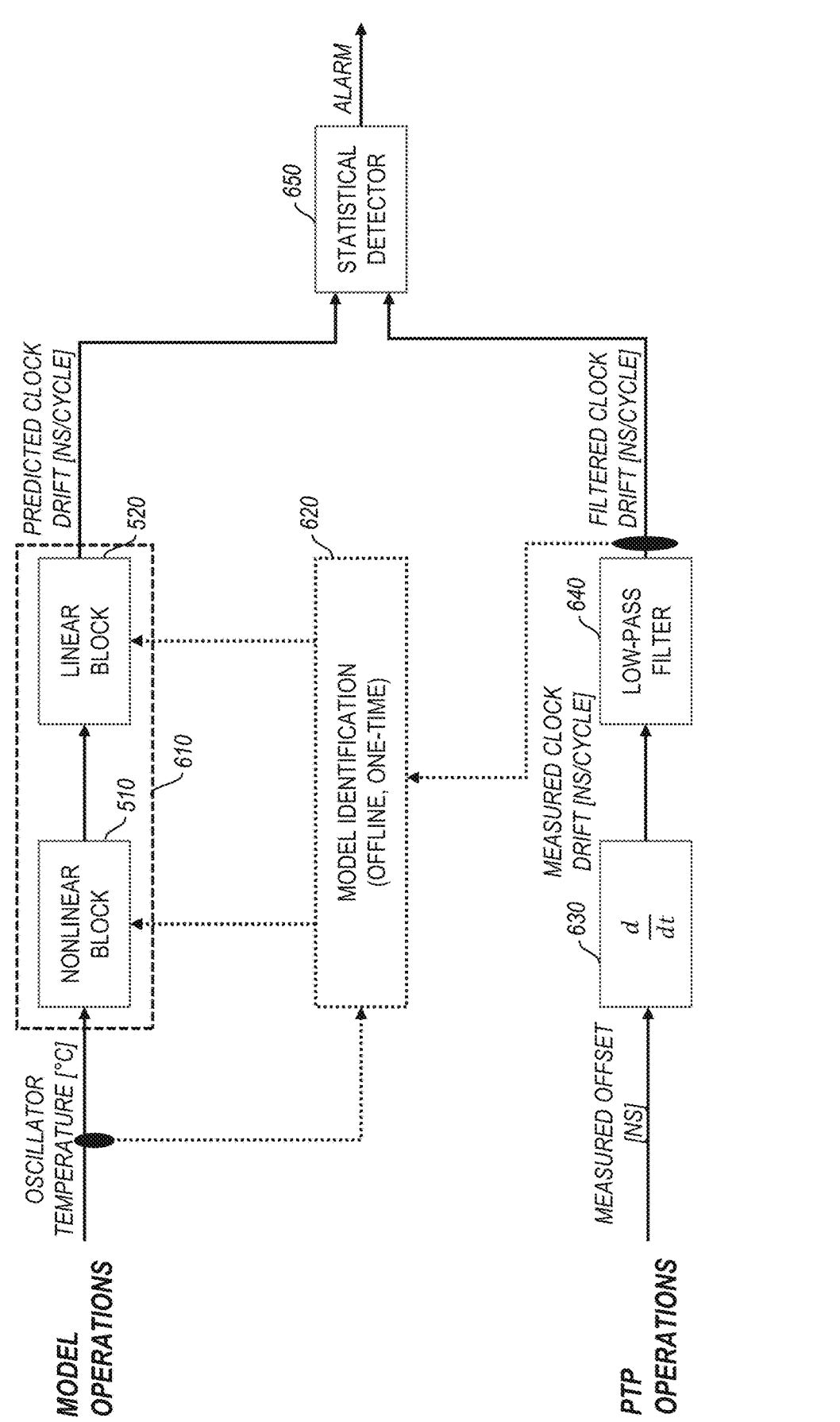
FIG. 6 illustrates additional data flows and processing operations used with an environmental condition time drift model, according to an example.

FIG. 6 illustrates additional data flows and processing operations used with an environmental condition time drift model. These data flows demonstrate example data processing operations that are performed by the detection system 110, including physical modeling operations 610 contrasted with time synchronization operations (e.g., a precision time protocol update). The physical modeling operations 610 may include the use of nonlinear analysis 510 and linear analysis 520, to produce a predicted clock drift in nanoseconds/cycle.

The time synchronization operations (e.g., provided by PTP time synchronization operations) include tracking the measured offset (e.g., a nanosecond measurement) over time, to produce a time derivative 630. This provides a measured or "actual" clock drift in nanoseconds/cycle. The time derivative is provided to a low-pass filter 640, producing a filtered clock drift (in nanoseconds/cycle).

The predicted clock drift (an estimated time drift value) and the filtered clock drift (a measured time drift value) may be compared with a statistical detector 650. In an example, the statistical detector 650 may provide an alarm if the comparison of the values is not within a statistically expected range. The statistical detector 650 may also implement other operations in connection with the time synchronization based on this comparison, such as to identify an integrity condition with the clock leader, and to cause the time synchronization protocol to select another clock leader based on the integrity condition.

Further operations may include the identification or tuning of a model for a particular time follower-time leader pair. For example, FIG. 6 depicts model identification operations 620 based on oscillator temperature and the results of the filtered clock drift. The model identification operations 620 may be used to determine a correct operational range for the particular environmental condition and applicable linear and non-linear functions for estimating the predicted clock drift.

FIG. 7 illustrates a flowchart of a method for clock synchronization. The method may implement the time synchronization and time drift detection scenarios discussed with reference to FIGS. 1 to 6, discussed above, or a variation of such scenarios. In an example, the method may be implemented in a computing system including a memory device (e.g., storage memory such as non-volatile memory, or in volatile memory) that stores processing instructions and data, and circuitry (e.g., at least one processor) that executes the processing instructions. In another example, the method may be implemented by at least one non-transitory machine-readable (or device-readable) medium capable of storing instructions, where the instructions when executed by circuitry (e.g., at least one processor) cause the circuitry to perform the method.

Operation 710 of the flowchart 700 includes obtaining (e.g., receiving) a timestamp provided from a time synchronization protocol, such as a protocol defined according to a Precision Time Protocol (PTP) standard. This time synchronization protocol is used to provide synchronized time values in a network to a clock follower from a clock leader as discussed herein. The use of the time synchronization protocol may include synchronization of time value in a hardware clock (e.g., a PTP hardware clock), or a virtual clock referencing the hardware clock.

Operation 720 of the flowchart 700 includes determining, based on the timestamp, a measured time drift value that represents an observed time drift of a hardware clock of the device. This time drift is observed relative to the clock leader, based on operation of the time synchronization protocol.

Operation 730 of the flowchart 700 includes determining an estimated time drift value that models a time drift of the hardware clock. This estimated time drift value is modeled from one or more environmental conditions experienced by the hardware clock. In an example, the estimated time drift value is produced from a model, with this model being identified (and/or having been trained) based on physical measurements corresponding to the one or more environmental conditions. As discussed with reference to FIG. 6, the model may be a physics-based model that includes a combined linear and non-linear identification of estimated values from the physical measurements.

In specific examples, the clock circuitry used to provide the hardware clock includes an oscillator, and the physical measurements of the oscillator used to operate the hardware clock correspond to one or more of: temperature, vibration, humidity, or pressure. For example, the model may produce an estimated measurement of a clock drift in nanoseconds per synchronization cycle based on the physical measurements. In this scenario, the measured time drift value is determined based on a measurement of a clock drift in nanoseconds per synchronization cycle, based on the synchronization cycle being performed with the device using the time synchronization protocol.

Operation 740 of the flowchart 700 includes comparing the measured time drift value with the estimated time drift value, such as with a comparison involving a statistically expected range. Other types of comparisons or comparison rules may also be provided and used.

Operation 750 of the flowchart 700 includes adjusting a clock of the device, based on the timestamp, in response to validating that the measured time drift value is within a statistically expected range corresponding to the estimated time drift value. In a specific example where a hardware clock is adjusted, two clock measurement/update cycles may be provided as discussed with reference to FIGS. 3A and 3B. This may include during a first clock update cycle of the time synchronization protocol, changing the time value maintained by the hardware clock based on the time synchronization protocol; and during a second clock update cycle of the time synchronization protocol: capturing a drift observation from the time synchronization protocol, and performing a measurement of the time drift of the hardware clock relative to the clock leader. Accordingly, the operations 710 to 740 may be repeated to iteratively check that the clock leader is operating as expected on an ongoing basis.

Alternatively, operation 760 of the flowchart 700 includes identifying an integrity condition with the clock leader, in response to not validating that the measured time drift value is within the statistically expected range corresponding to the estimated time drift value. Operation 760 may also include selecting another clock leader based on the integrity condition with the clock leader, or performing another remedial action.

Figure 8:
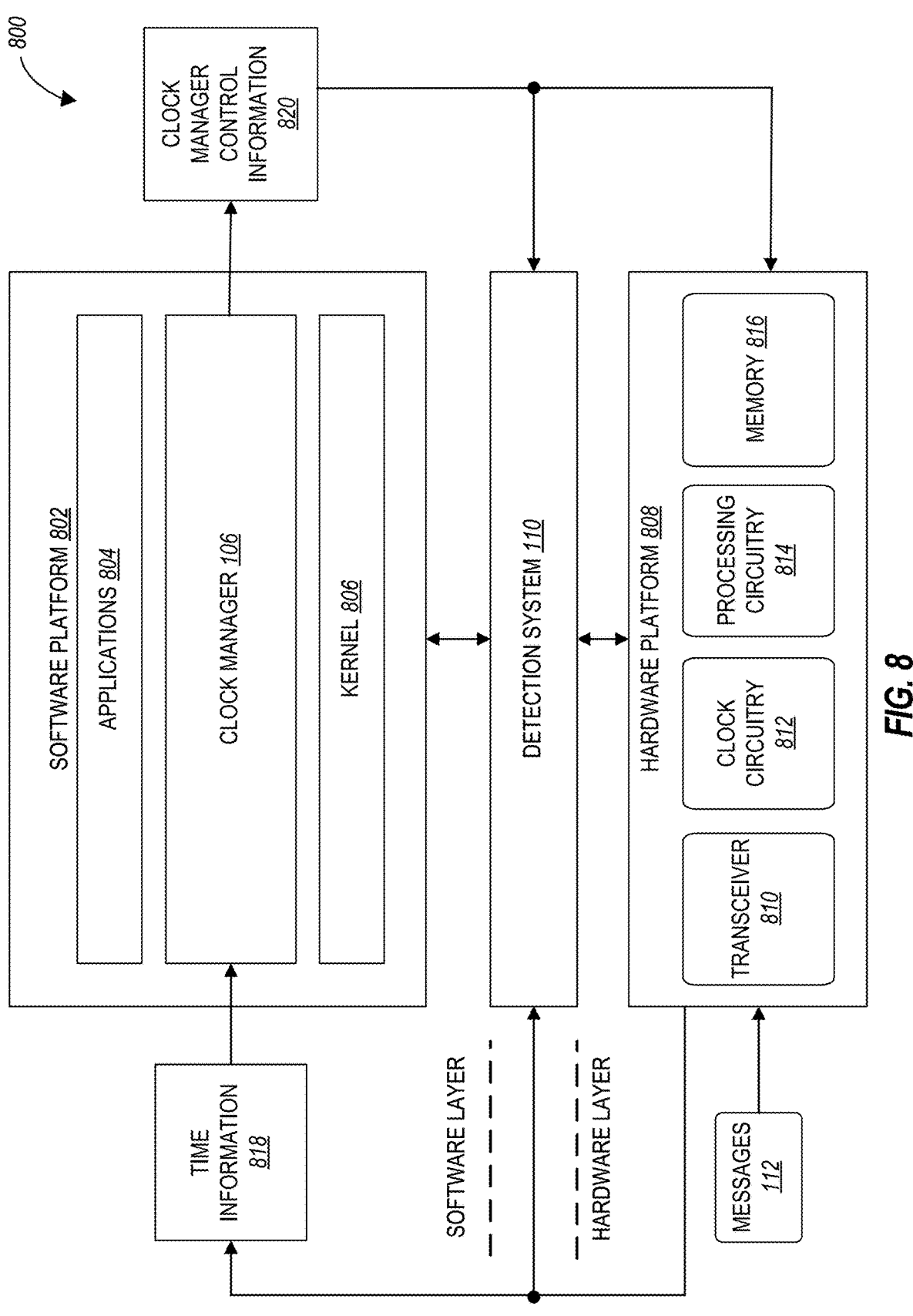
FIG. 8 illustrates an example configuration of an apparatus or system using the time synchronization and time drift detection techniques, according to an example.

FIG. 8 illustrates an example configuration of an apparatus or system using the time synchronization and time drift detection techniques, according to the examples above. The apparatus 800 includes a software platform 802 and a hardware platform 808. This apparatus 800 provides a more detailed view of an example network node 104 that implements one or more time synchronization protocols or standards. The apparatus 800 may be implemented as or as part of a vehicle, robot, industrial machine or any other device suitable for a time-synchronized network.

The network node 104 may operate in accordance with a timing protocol, such as a precision time protocol (PTP) for IEEE 1588, IEEE 802.1AS, and so forth. For instance, the network node 104 may operate in accordance with IEEE 802.1AS which implements a hierarchical network to synchronize clock followers to a clock leader through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a clock leader. The time message may also comprise, for example, a packet delay message type with additional fields and attributes.

As depicted in FIG. 8, the apparatus 800 may include a software platform 802 and a hardware platform 808. The software platform 802 may include, among other software components, one or more applications 804, a kernel 806, and clock manager 106. The hardware platform 808 may include, among other hardware components, a network interface such as a transceiver 810, clock circuitry 812 (e.g., to implement the clock 108 (not shown)), processing circuitry 814 and memory 816.

As depicted in FIG. 8, the apparatus 800 includes a clock circuitry 812 to implement a hardware clock (e.g., a PHC) for a device, such as a network node 104. The apparatus 800 includes processing circuitry 814 coupled to the clock circuitry 812, the processing circuitry 814 to execute instructions to perform operations for a clock manager 106. The clock manager 106 is operative to process messages 112 with time information 818 for a network, such as time-synchronized fabric 102. The clock manager 106 generates clock manager control information 820 to adjust the clock circuitry 812 (or, determine an offset of the clock circuitry 812 for a virtual clock) for a network time of the time-synchronized fabric 102. The clock manager control information 820 may comprise one or more parameters to adjust the clock circuitry 812 for the apparatus 800. The one or more parameters may represent, for example, adjustments to a phase or frequency of the clock circuitry 812. For example, the clock manager control information 820 may comprise a phase or frequency adjustment based on a time offset between a reference time and a time maintained by the clock circuitry 812. The reference time is based on the time information 818 in at least one message 112.

The processing circuitry 814 may include circuitry or processor logic, such as, for example, any of a variety of commercial processors. In some examples, the processing circuitry 814 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 814 may include graphics processing portions and may include dedicated memory, multiple-threaded processing and/or some other parallel processing capability. In some examples, the processing circuitry 814 may be an application specific integrated circuit (ASIC) or a field programmable integrated circuit (FPGA). In some examples, the processing circuitry 814 may be circuitry arranged to perform computations related to time synchronization and network communications, such as switching, clock leader and follower roles, routing, security, and so forth.

The memory 816 may include logic, a portion of which includes arrays of integrated circuits, forming non-volatile memory to persistently store data or a combination of non-volatile memory and volatile memory. It is to be appreciated, that the memory 816 may be based on any of a variety of technologies. In particular, the arrays of integrated circuits included in memory 816 may be arranged to form one or more types of memory, such as, for example, dynamic random access memory (DRAM), NAND memory, NOR memory, or the like.

The transceiver 810 may include logic and/or features to support a communication interface. For example, the transceiver 810 may include one or more interfaces that operate according to various communication protocols or standards to communicate over direct or network communication links. Direct communications may occur via use of communication protocols or standards described in one or more industry standards (including progenies and variants). For example, the transceiver 810 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 810 may be arranged to support wireless communication protocols or standards, such as, for example, Wi-Fi, Bluetooth, ZigBee, LTE, 5G, or the like.

The apparatus 800 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

The network node 104 may be implemented as a clock leader or clock follower for the time-synchronized network 100. As previously discussed, the clock manager 106 may ensure that the clock circuitry 812 maintains a network time for the time-synchronized network 100. When operating in a clock leader role, the clock manager 106 may send a message 112 with time information 818 representing a current network time to one or more nodes operating in a clock follower role for the time-synchronized network 100. When operating in a clock follower role, the clock manager 106 may receive a message (one of messages 112) from a clock leader node in the time-synchronized network 100.

The clock manager 106 may use the time information 818 from the message to synchronize a local device time with the current network time maintained by the clock circuitry 812. The clock manager 106 analyzes the time information 818 and determines whether to adjust a parameter (e.g., phase or frequency) of the clock circuitry 812 to synchronize a clock of the clock circuitry 812 to the current network time. The messages 112 may carry time information for a network node, such as an origin time, resident time, link delays, among other types of clock information. The messages 112 may comprise, for example, synchronization messages or follow-up messages. The network node retrieves or decodes the time information from the messages 112, and utilize the time information to synchronize an internal local clock with a network time issued by a clock leader or grand clock leader.

The apparatus 800 includes a detection system 110 to monitor the validity of time changes provided by the clock leader. As previously discussed, the detection system 110 generally monitors and compares the amount of time drift at the apparatus 800 to the amount of time drift indicated by time synchronization communications from the clock leader. The detection system 110 suspects or detects abnormal or malicious behavior of the time leader (e.g., an integrity condition of the clock leader) based on statistically significant deviations between an estimated time drift modeled from environmental conditions at the time follower, and an actual time drift measured from an amount of drift between the time follower and the time leader.

In an example, the detection system 110 may be implemented as part of a software layer for the apparatus 800, such as the software platform 802. In another embodiment, the detection system 110 may be implemented as part of a hardware layer for the apparatus 800, such as the hardware platform 808. In yet another embodiment, certain elements of the detection system 110 may be implemented in the software platform 802, while other elements of the detection system 110 may be implemented in the hardware platform 808. Embodiments are not limited in this context.

The detection system 110 analyzes the messages 112 and/or other types of information to determine drift measurements of the clock leader, compares the drift measurements of the clock leader to those of the apparatus (the clock follower), and determines whether to generate an alert or take corrective action for the apparatus 800 based on results of the analysis. The detection system 110 can also receive and analyze other types of information, such as clock manager control information 820 in transit from the clock manager 106 of the software platform 802 to the hardware platform 808. For instance, the detection system 110 can consume software control messages, or it can have one or more taps on a hardware bus or signal lines used to communicate electrical signals to the hardware platform 808.

Although FIG. 8 depicts the detection system 110 implemented as part of the apparatus 800, it may be appreciated that the detection system 110 may be implemented by another apparatus, device, or system communicatively coupled to the apparatus 800. For instance, the detection system 110 may be implemented as part of a detection system for the apparatus 800 that is separate from the apparatus 800 or a device other than a device that implements the apparatus 800. For instance, if the apparatus 800 is implemented by a network node 104a, the detection system 110 of the apparatus 800 could optionally be implemented in a network node 104b. The detection system 110 could also be implemented by a detection system communicatively coupled to the network node 104, either directly via a wired or wireless connection, or indirectly via the time-synchronized fabric 102. Embodiments are not limited in this context.

Accordingly, embodiments to implement the approaches above may be implemented in one or a combination of hardware, firmware, and software. Embodiments may also be implemented as instructions stored on a machine-readable (e.g., device-readable) storage medium or device, which may be read and executed by at least one processor to perform the operations described herein. A machine-readable or device-readable storage medium may include any non-transitory mechanism for storing information in a form readable by a machine (e.g., a computer). For example, a machine-readable storage medium may include read-only memory (ROM), random-access memory (RAM), magnetic disk storage media, optical storage media, flash-memory devices, and other storage devices and media (e.g., represented in portions of computer system 900 in FIG. 9, discussed below).

A processor subsystem (e.g., processor 902 in FIG. 9, discussed below) may be used to execute instructions on the computer-readable medium for any of the software operations discussed herein. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, a hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware implementations, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in the present disclosure, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in the present disclosure, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 9:
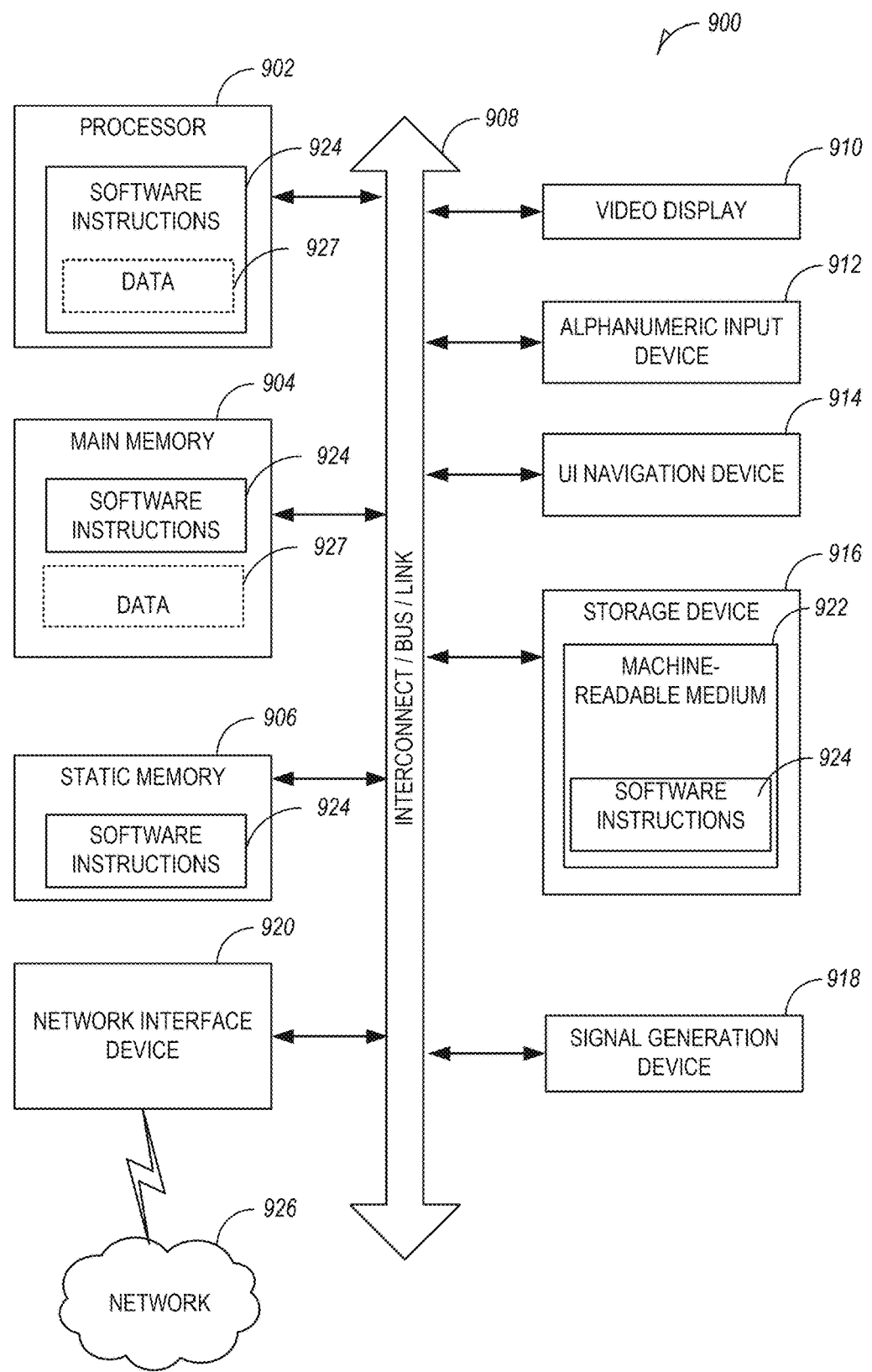
FIG. 9 is a block diagram illustrating an example machine upon which any one or more of the techniques (e.g., methodologies) discussed herein may perform, according to an example.

FIG. 9 is a block diagram illustrating a machine in the example form of a computer system 900, within which a set or sequence of instructions (e.g., programmed instructions, instructions embedded in logic in attached circuitry, etc.) may be executed to cause the machine to perform any one of the methodologies discussed herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a smartphone or other mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., interconnect or bus). The computer system 900 may further include a video display unit 910, an alphanumeric input device 912 (e.g., a keyboard), and a user interface (UI) navigation device 914 (e.g., a mouse). In one aspect, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media. As an example, the software instructions 924 may include instructions to implement and execute the clock and time synchronization management operations via the processor (e.g., with software as configured and operated in the examples of FIG. 1 to FIG. 8). As a further example, the main memory 904 (or the other memory or storage) may host various data 927 used in connection with the clock and time synchronization management operations discussed herein.

While the machine-readable medium 922 is illustrated in an example aspect to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, 6G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 is a device, comprising: clock circuitry to operate a hardware clock; and clock synchronization circuitry configured to: obtain a timestamp from a time synchronization protocol, the time synchronization protocol to provide synchronized time values in a network from a clock leader; determine, based on the timestamp, a measured time drift value that represents a time drift of the hardware clock relative to the clock leader; determine an estimated time drift value that models a time drift of the hardware clock, the estimated time drift value modeled from one or more environmental conditions of the clock circuitry; compare the measured time drift value with the estimated time drift value; and, perform a clock adjustment based on the timestamp, in response to validating that the measured time drift value is within a statistically expected range corresponding to the estimated time drift value.

In Example 2, the subject matter of Example 1 optionally includes the clock synchronization circuitry further configured to: identify an integrity condition with the clock leader, in response to determining that the measured time drift value is outside the statistically expected range corresponding to the estimated time drift value; and select another clock leader based on the integrity condition with the clock leader.

In Example 3, the subject matter of any one or more of Examples 1-2 optionally include subject matter where the estimated time drift value is produced from a model, and wherein the model is identified based on physical measurements corresponding to the one or more environmental conditions.

In Example 4, the subject matter of Example 3 optionally includes subject matter where the clock circuitry includes an oscillator, and wherein the physical measurements of the oscillator used to operate the hardware clock correspond to one or more of: temperature, vibration, humidity, or pressure.

In Example 5, the subject matter of any one or more of Examples 3-4 optionally include subject matter where the model is a physics-based model that includes a combined linear and non-linear identification of estimated values from the physical measurements.

In Example 6, the subject matter of Example 5 optionally includes subject matter where the physics-based model produces an estimated measurement of a clock drift in nanoseconds per synchronization cycle based on the physical measurements, and wherein the measured time drift value is determined based on a measurement of a clock drift in nanoseconds per synchronization cycle, the synchronization cycle performed with the device using the time synchronization protocol.

In Example 7, the subject matter of any one or more of Examples 1-6 optionally include subject matter where to perform the clock adjustment includes to change a virtual clock referencing the hardware clock.

In Example 8, the subject matter of any one or more of Examples 1-7 optionally include subject matter where to perform the clock adjustment includes to change a time value maintained by the hardware clock.

In Example 9, the subject matter of Example 8 optionally includes subject matter where: during a first clock update cycle of the time synchronization protocol, the time value maintained by the hardware clock is changed based on the time synchronization protocol; and during a second clock update cycle of the time synchronization protocol, a drift observation from the time synchronization protocol is captured, and the time drift of the hardware clock is measured relative to the clock leader.

In Example 10, the subject matter of any one or more of Examples 1-9 optionally include subject matter where the time synchronization protocol is defined according to a Precision Time Protocol (PTP) standard, and wherein the hardware clock is a PTP hardware clock (PHC).

In Example 11, the subject matter of any one or more of Examples 1-10 optionally include subject matter where the device is a network interface controller of a computing system, and wherein the clock adjustment is used to control the hardware clock or another clock maintained by the computing system.

Example 12 is at least one non-transitory device-readable medium capable of storing instructions, wherein the instructions when executed by clock synchronization circuitry of a device, cause the clock synchronization circuitry to: receive a timestamp from a time synchronization protocol, the time synchronization protocol to provide synchronized time values in a network from a clock leader; determine, based on the timestamp, a measured time drift value that represents a time drift of a hardware clock of the device, the time drift observed relative to the clock leader; determine an estimated time drift value that models a time drift of the hardware clock, the estimated time drift value modeled from one or more environmental conditions experienced by the hardware clock; compare the measured time drift value with the estimated time drift value; and perform a clock adjustment based on the timestamp, in response to validating that the measured time drift value is within a statistically expected range corresponding to the estimated time drift value.

In Example 13, the subject matter of Example 12 optionally includes the instructions further to cause the clock synchronization circuitry to: identify an integrity condition with the clock leader, in response to determining that the measured time drift value is outside the statistically expected range corresponding to the estimated time drift value; and select another clock leader based on the integrity condition with the clock leader.

In Example 14, the subject matter of any one or more of Examples 12-13 optionally include subject matter where the estimated time drift value is produced from a model, and wherein the model is identified based on physical measurements corresponding to the one or more environmental conditions.

In Example 15, the subject matter of Example 14 optionally includes subject matter where the physical measurements used to operate the hardware clock correspond to one or more of: temperature, vibration, humidity, or pressure.

In Example 16, the subject matter of any one or more of Examples 14-15 optionally include subject matter where the model is a physics-based model that includes a combined linear and non-linear identification of estimated values from the physical measurements.

In Example 17, the subject matter of Example 16 optionally includes subject matter where the physics-based model produces an estimated measurement of a clock drift in nanoseconds per synchronization cycle based on the physical measurements, and wherein the measured time drift value is determined based on a measurement of a clock drift in nanoseconds per synchronization cycle, the synchronization cycle performed with the device using the time synchronization protocol.

In Example 18, the subject matter of any one or more of Examples 12-17 optionally include subject matter where to perform the clock adjustment includes to change a virtual clock referencing the hardware clock.

In Example 19, the subject matter of any one or more of Examples 12-18 optionally include subject matter where to perform the clock adjustment includes to change a time value maintained by the hardware clock, and wherein: during a first clock update cycle of the time synchronization protocol, the time value maintained by the hardware clock is changed based on the time synchronization protocol; and during a second clock update cycle of the time synchronization protocol, a drift observation from the time synchronization protocol is captured, and the time drift of the hardware clock is measured relative to the clock leader.

In Example 20, the subject matter of any one or more of Examples 12-19 optionally include subject matter where the time synchronization protocol is defined according to a Precision Time Protocol (PTP) standard, and wherein the hardware clock is a PTP hardware clock (PHC).

Example 21 is a method for clock synchronization performed by a clock follower device, comprising: receiving a timestamp from a time synchronization protocol, the time synchronization protocol to provide synchronized time values in a network from a clock leader; determining, based on the timestamp, a measured time drift value that represents a time drift of a hardware clock of the clock follower device, the time drift observed relative to the clock leader; determining an estimated time drift value that models a time drift of the hardware clock, the estimated time drift value modeled from one or more environmental conditions experienced by the hardware clock; comparing the measured time drift value with the estimated time drift value; and performing a clock adjustment based on the timestamp, in response to validating that the measured time drift value is within a statistically expected range corresponding to the estimated time drift value.

In Example 22, the subject matter of Example 21 optionally includes identifying an integrity condition with the clock leader, in response to determining that the measured time drift value is outside the statistically expected range corresponding to the estimated time drift value; and selecting another clock leader based on the integrity condition with the clock leader.

In Example 23, the subject matter of any one or more of Examples 21-22 optionally include subject matter where the estimated time drift value is produced from a model, and wherein the model is identified based on physical measurements corresponding to the one or more environmental conditions.

In Example 24, the subject matter of Example 23 optionally includes subject matter where the physical measurements used to operate the hardware clock correspond to one or more of: temperature, vibration, humidity, or pressure.

In Example 25, the subject matter of any one or more of Examples 23-24 optionally include subject matter where the model is a physics-based model that includes a combined linear and non-linear identification of estimated values from the physical measurements.

In Example 26, the subject matter of Example 25 optionally includes subject matter where the physics-based model produces an estimated measurement of a clock drift in nanoseconds per synchronization cycle based on the physical measurements, and wherein the measured time drift value is determined based on a measurement of a clock drift in nanoseconds per synchronization cycle, the synchronization cycle performed with the clock follower device using the time synchronization protocol.

In Example 27, the subject matter of Example 26 optionally includes subject matter where performing the clock adjustment of the clock follower device includes changing a virtual clock referencing the hardware clock.

In Example 28, the subject matter of Example 27 optionally includes subject matter where performing the clock adjustment of the clock follower device includes changing a time value maintained by the hardware clock.

In Example 29, the subject matter of Example 28 optionally includes subject matter where: during a first clock update cycle of the time synchronization protocol, the time value maintained by the hardware clock is changed based on the time synchronization protocol; and during a second clock update cycle of the time synchronization protocol, a drift observation from the time synchronization protocol is determined, and a measurement of the time drift of the hardware clock is measured relative to the clock leader.

In Example 30, the subject matter of any one or more of Examples 21-29 optionally include subject matter where the time synchronization protocol is defined according to a Precision Time Protocol (PTP) standard, and wherein the hardware clock is a PTP hardware clock (PHC).

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate aspect. The scope of the embodiments disclosed herein is to be determined with reference to the appended claims, along with the full scope of equivalents to which such claims are entitled.

What is claimed is:

1. A device, comprising:
clock circuitry to operate a hardware clock; and
clock synchronization circuitry configured to:
    obtain a timestamp from a time synchronization protocol, the time synchronization protocol to provide synchronized time values in a network from a clock leader;
    determine, based on the timestamp, a measured time drift value that represents a time drift of the hardware clock relative to the clock leader;
    determine an estimated time drift value that models a time drift of the hardware clock, the estimated time drift value modeled from one or more environmental conditions of the clock circuitry;
    compare the measured time drift value with the estimated time drift value;
    perform a clock adjustment based on the timestamp, in response to validating that the measured time drift value is within a statistically expected range corresponding to the estimated time drift value;
    identify an integrity condition with the clock leader, in response to determining that the measured time drift value is outside the statistically expected range corresponding to the estimated time drift value; and
    select another clock leader based on the integrity condition with the clock leader.

2. The device of claim 1, wherein the estimated time drift value is produced from a model, and wherein the model is identified based on physical measurements corresponding to the one or more environmental conditions.

3. The device of claim 2, wherein the clock circuitry includes an oscillator, and wherein the physical measurements of the oscillator used to operate the hardware clock correspond to one or more of: temperature, vibration, humidity, or pressure.

4. The device of claim 2, wherein the model is a physics-based model that includes a combined linear and non-linear identification of estimated values from the physical measurements.

5. The device of claim 4, wherein the physics-based model produces an estimated measurement of a clock drift in nanoseconds per synchronization cycle based on the physical measurements, and wherein the measured time drift value is determined based on a measurement of a clock drift in nanoseconds per synchronization cycle, the synchronization cycle performed with the device using the time synchronization protocol.

6. The device of claim 1, wherein to perform the clock adjustment includes to change a virtual clock referencing the hardware clock.

7. The device of claim 1, wherein to perform the clock adjustment includes to change a time value maintained by the hardware clock.

8. The device of claim 7, wherein:

during a first clock update cycle of the time synchronization protocol, the time value maintained by the hardware clock is changed based on the time synchronization protocol; and during a second clock update cycle of the time synchronization protocol, a drift observation from the time synchronization protocol is captured, and the time drift of the hardware clock is measured relative to the clock leader.

9. The device of claim 1, wherein the time synchronization protocol is defined according to a Precision Time Protocol (PTP) standard, and wherein the hardware clock is a PTP hardware clock (PHC).

10. The device of claim 1, wherein the device is a network interface controller of a computing system, and wherein the clock adjustment is used to control the hardware clock or another clock maintained by the computing system.

11. At least one non-transitory device-readable medium capable of storing instructions, wherein the instructions when executed by clock synchronization circuitry of a device, cause the clock synchronization circuitry to:

receive a timestamp from a time synchronization protocol, the time synchronization protocol to provide synchronized time values in a network from a clock leader;

determine, based on the timestamp, a measured time drift value that represents a time drift of a hardware clock of the device, the time drift observed relative to the clock leader;

determine an estimated time drift value that models a time drift of the hardware clock, the estimated time drift value modeled from one or more environmental conditions experienced by the hardware clock;

compare the measured time drift value with the estimated time drift value;

perform a clock adjustment based on the timestamp, in response to validating that the measured time drift value is within a statistically expected range corresponding to the estimated time drift value;

identify an integrity condition with the clock leader, in response to determining that the measured time drift value is outside the statistically expected range corresponding to the estimated time drift value; and select another clock leader based on the integrity condition with the clock leader.

12. The at least one non-transitory device-readable medium of claim 11, wherein the estimated time drift value is produced from a model, and wherein the model is identified based on physical measurements corresponding to the one or more environmental conditions.

13. The at least one non-transitory device-readable medium of claim 12, wherein the physical measurements used to operate the hardware clock correspond to one or more of: temperature, vibration, humidity, or pressure.

14. The at least one non-transitory device-readable medium of claim 12, wherein the model is a physics-based model that includes a combined linear and non-linear identification of estimated values from the physical measurements.

15. The at least one non-transitory device-readable medium of claim 14, wherein the physics-based model produces an estimated measurement of a clock drift in nanoseconds per synchronization cycle based on the physical measurements, and wherein the measured time drift value is determined based on a measurement of a clock drift in nanoseconds per synchronization cycle, the synchronization cycle performed with the device using the time synchronization protocol.

16. The at least one non-transitory device-readable medium of claim 11, wherein to perform the clock adjustment includes to change a virtual clock referencing the hardware clock.

17. The at least one non-transitory device-readable medium of claim 11, wherein to perform the clock adjustment includes to change a time value maintained by the hardware clock, and wherein:

during a first clock update cycle of the time synchronization protocol, the time value maintained by the hardware clock is changed based on the time synchronization protocol; and during a second clock update cycle of the time synchronization protocol, a drift observation from the time synchronization protocol is captured, and the time drift of the hardware clock is measured relative to the clock leader.

18. The at least one non-transitory device-readable medium of claim 11, wherein the time synchronization protocol is defined according to a Precision Time Protocol (PTP) standard, and wherein the hardware clock is a PTP hardware clock (PHC).

* * * * *